W. P. COSPER.

WATER HEATER.

APPLICATION FILED JUNE 1, 1909.

Reissued Nov. 8, 1910.

13,166.

3 SHEETS—SHEET 1.

Witnesses:

Geo. D. Perry

Albert J. Sainsot.

Inventor:

William P. Cosper by J. R. Barnett

Atty

THE NORRIS PETERS CO., WASHINGTON, D. C.

W. P. COSPER.

WATER HEATER.

APPLICATION FILED JUNE 1, 1909.

Reissued Nov. 8, 1910.

13,166.

3 SHEETS—SHEET 2.

Witnesses:

Ira D. Perry

Albert J. Sanders

Inventor:

William P. Cosper by

O. R. Barnett

Atty.

THE NORRIS PETERS CO., WASHINGTON, D. C.

W. P. COSPER.
WATER HEATER.
APPLICATION FILED JUNE 1, 1909.
Reissued Nov. 8, 1910.
13,166.
3 SHEETS—SHEET 3.
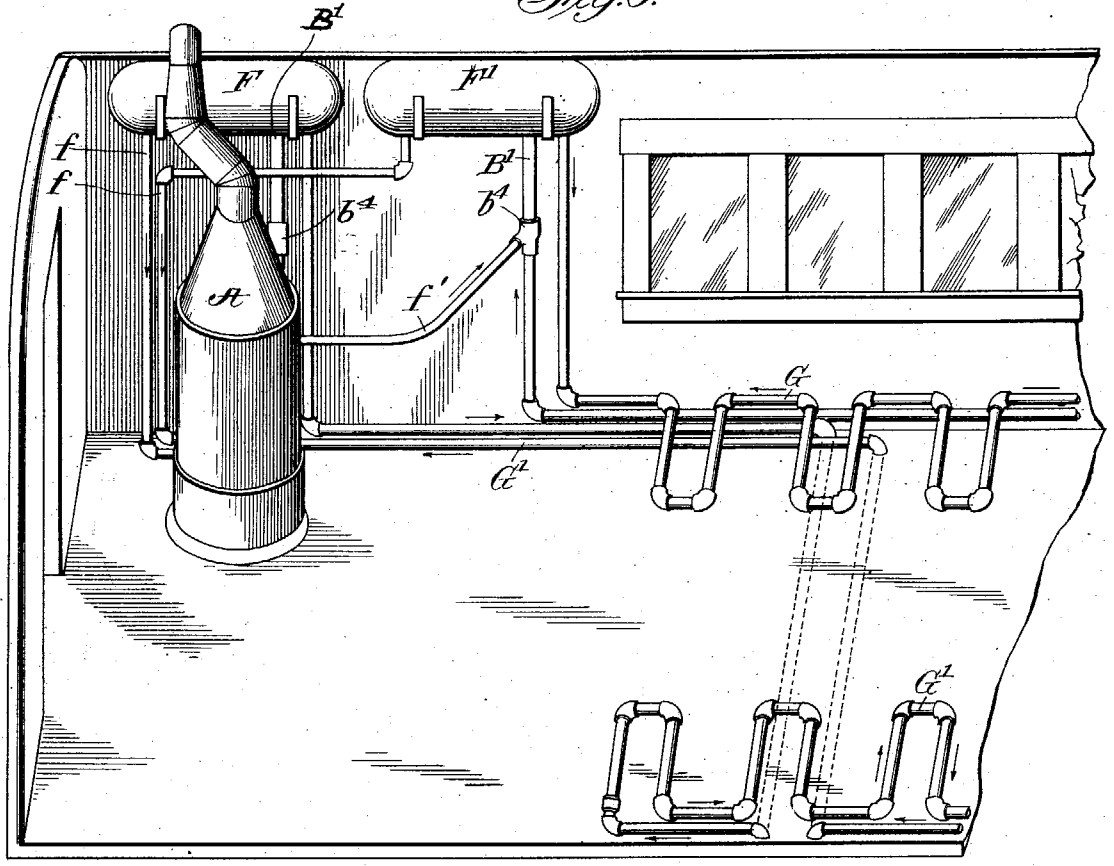
Witnesses:
Ira D. Perry
Albert J. Sands
Inventor:
William P. Cosper
by J. P. Barnett
Atty.
THE NORRIS PETERS CO., WASHINGTON, D. C.

UNITED STATES PATENT OFFICE.

WILLIAM P. COSPER, OF CHICAGO, ILLINOIS, ASSIGNOR TO ROTH MANUFACTURING COMPANY, A CORPORATION OF ILLINOIS.

WATER-HEATER.

13,166. Specification of Reissued Letters Patent. Reissued Nov. 8, 1910.

Original No. 867,480, dated October 1, 1907, Serial No. 263,707. Application for reissue filed June 1, 1909. Serial No. 499,601.

*To all whom it may concern:*

Be it known that I, WILLIAM P. COSPER, a citizen of the United States, and a resident of the city of Chicago, in the county of Cook and State of Illinois, have invented certain new and useful Improvements in Water-Heaters; and I do hereby declare that the following is a full, clear, and exact description of the same, reference being had to the accompanying drawings, and to the letters of reference marked thereon, which form a part of this specification.

This invention relates to improvements in water heaters and more particularly to a water heater adapted for heating passenger cars though obviously it is equally adaptable for heating any other compartment or compartments in which a system of radiating pipes is employed. Often in devices of this class, especially where the system of circulation is of considerable length, much difficulty has been encountered in procuring sufficiently rapid circulation of the water to prevent its becoming unduly cooled while passing through the radiating pipes and consequently decreasing the efficiency of the system.

The object of this invention is to provide a heater adapted to constantly keep the water at a high temperature and by means of the rapid flow of water through the same to draw the water through the radiating pipes at a sufficiently high speed to prevent any considerable fall of temperature while traversing the system, thereby maintaining the car or other compartment with which it is connected at an approximately even temperature throughout.

A further object of the invention is to provide a cheap and simple device by means of which the water may be heated to a high temperature with the expenditure of a minimum amount of time and fuel.

The invention consists in the matters hereinafter described and more fully pointed out and defined in the appended claims.

Figure 1:
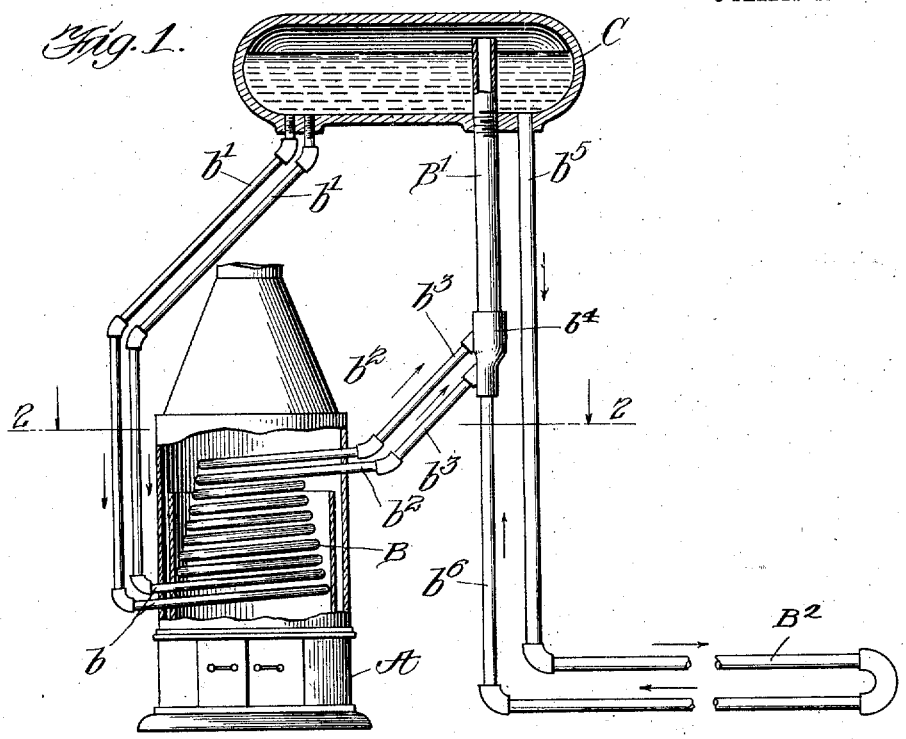
Figure 2:
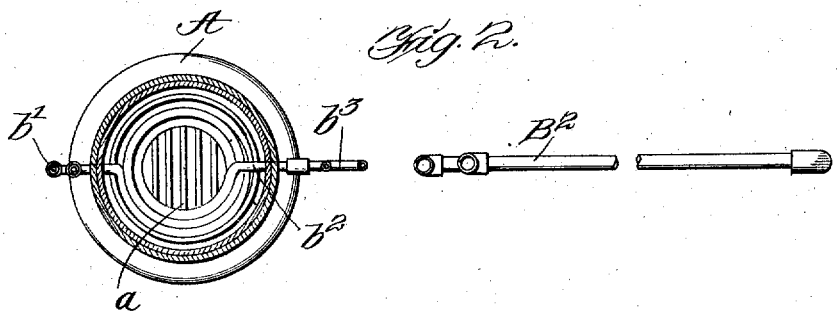
Figure 4:
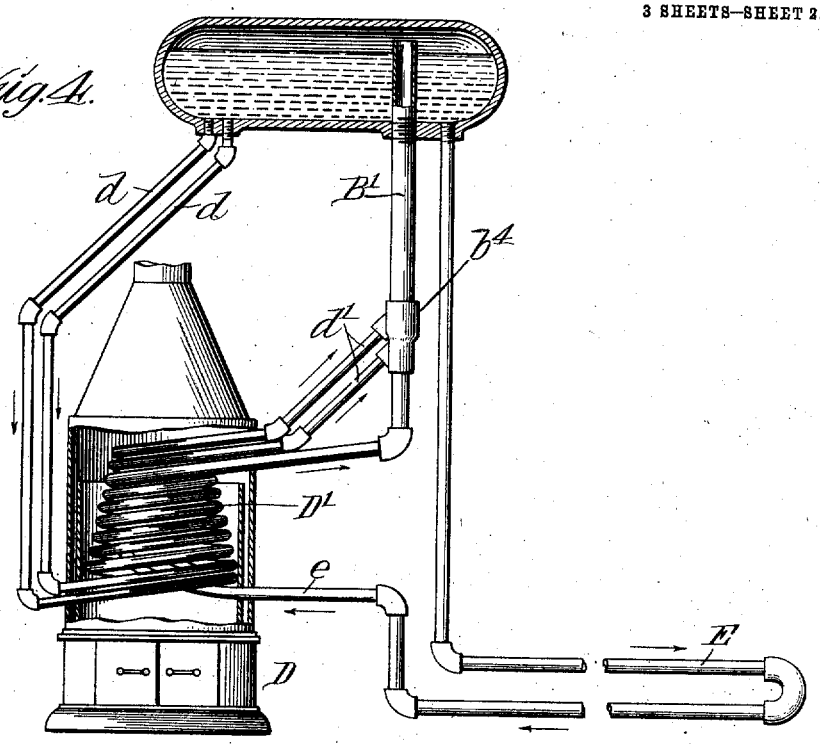
Figure 5:
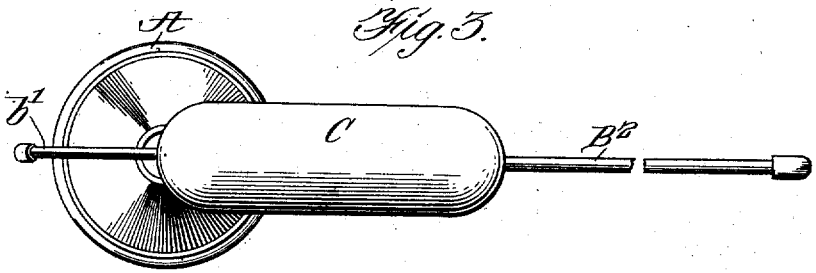

In the drawings, Figure 1 is a fragmentary side elevation, partly broken, of a device embodying my invention. Fig. 2 is a section taken on line 2—2 of Fig. 1. Fig. 3 is a top plan view of the heater. Fig. 4 is a side elevation, partly broken, of a modification embodying my invention. Fig. 5 is a side elevation of a device embodying my invention and connected with a plurality of circulating systems.

As shown in said drawings, A represents a furnace or stove of any usual or preferred construction such as is usually employed in hot water heating systems of this class, and in which, above the grate $a$, is supported the heating coil in any desired manner. Said coil B as shown more clearly in Figs. 1 and 2 comprises two or any number of copper or iron pipes, which as shown form a conical coil though said pipes need not necessarily be coiled in the stove. Said pipes at the base of the coil project through the wall of the stove and the ends $b$—$b$ thereof are connected by suitable connections with the supply pipes $b'$—$b'$ which open at their upper ends through the bottom of the expansion tank C, at one end thereof. Said expansion tank is supported above the stove by any desired means and may be of any usual or preferred construction.

The upper ends $b^2$—$b^2$ of the coil open through the side or top of the stove and are connected by means of pipes $b^3$—$b^3$ with the pipe fitting or joint $b^4$ the upper portion of which as shown is of greater diameter than the lower portion thereof. A return pipe B′ is connected in the upper end of said fitting and extends upwardly therefrom through the bottom of the expansion tank C to a point within the tank above the normal level of the water contained therein.

The inlet end $b^5$ of the radiating pipe $B^2$ connects in the end of the tank adjacent the pipe B′ and leads through the compartment to be heated in any desired manner, and the return end thereof $b^6$ is connected in the lower or restricted end of said fitting $b^4$, forming a continuation of the pipe B′. As shown said pipe B′ is of approximately the same cross sectional area as the combined cross sectional areas of the pipes $b^6$ and $b^3$—$b^3$, and is adapted to carry back to the tank, both, the water which flows through the heating coil B, and through the radiating pipe or coil $B^2$.

If preferred the water returning from the radiating pipe may also be made to pass through the stove, as is shown more clearly in Fig. 4, in which case the stove D is provided with a coil D′ having feed pipes $d$—$d$ and outlet pipe $d'$—$d'$ as before described, and the return end $e$ of the radiating pipe E passes through the wall of the stove and is coiled with the heating coil D′ to get the direct action of the heat of the stove, and after passing out of the stove at the upper end of the coil is connected with the fitting $b^4$ as before described.

The heater may be used with one system of radiating pipes as shown in Figs. 1 to 4 inclusive or if preferred with a plurality of systems as shown in Fig. 5 in which case an expansion tank for each system, indicated respectively by F and F′, is provided. The feed and discharge pipes *f*—*f*′ are connected therewith and with the heating coil in the stove as before described. In this instance, however as shown, only one each of said pipes are used though obviously any desired number may be employed. Leading from one of said tanks as shown F′, is the radiating pipe G which extends along one side of the car or other compartment and from the other of said tanks F, the radiating pipe G′ extends along the other side of the car thereby heating each side of the car with a separate system and insuring a very uniform temperature. Said radiating pipes G and G′ are connected with the tanks and fittings $b^4$ as before described with reference to the pipes $B^2$ and E.

The operation is as follows: The stove or furnace which may be of any preferred construction heats to a high temperature the water in the heating coil which is normally filled with water from the expansion tank above the stove. As the water becomes heated it rises in the coil and together with the steam generated therefrom passes through the discharge pipes from the coil and the return pipe B′ with great force into the tank thereby setting up a continuous current through the heating coil. The rapid discharge of water and steam through the pipe B′ tends to create a vacuum in the return end of the radiating pipe, which is connected therewith, thereby drawing the water rapidly through said radiating pipe and maintaining an approximately even temperature therein. The loss of heat from the water resulting from passing through the radiating pipe is immediately regained while the water is passing through the pipe B′ and expansion tank before again entering said radiating pipe.

Owing to the discharge end of the radiating pipe opening above the water level of the expansion tank, back pressure from the water in the expansion tank, which would otherwise occur if the radiating pipe opened in said tank below the water level is prevented. Instead of this pressure a partial vacuum is created in the discharge end of the radiating pipe which greatly facilitates the circulation. By preventing the water after being forced into the expansion tank, flowing back into the discharge end of the radiating pipe, back pressure and water hammering is avoided.

In the device shown in Fig. 4, the return water from the radiating pipe E passes through the stove before entering the tank insuring its reaching a maximum temperature before again entering the radiating pipe. When more than one radiating system is employed an expansion tank may be connected with each system and with the heating coil, in which case a very uniform temperature can be maintained over an extended area with but slight consumption of fuel.

While I have shown but two pipes in the heating coil it is obvious that any preferred number of pipes may be employed and the shape of the coil may be varied, and any construction or type of stove suitable for the purpose may be employed in connection therewith and I therefore do not wish to limit in this invention other than as necessitated by the prior art and as stated in the claims as obviously many details of construction may be varied without departing from the principles of my invention. Considering the invention apart from the particular instrumentalities herein shown for putting it into practice, it involves the division of the water circulatory system into two circuits: one, the radiating circuit—coil $B^2$ and the expansion tank by means of which the circuit is completed—which circuit effects the heating of the compartment; and the other the water heating circuit—coil B and its connections—which circuit taps the radiating circuit at two points between which it passes through the stove or other device for imparting heat.

I claim as my invention:

1. In a device of the class described the combination with a circulating or expansion tank of a radiating pipe communicating therewith at one end below the water level and discharging above the normal water level in said tank at its opposite end and a heating coil opening from said tank below the water level and discharging into the return portion of the radiating pipe tending to create a vacuum in the return portion of the radiating pipe.

2. In a device of the class described the combination with a circulating or expansion tank of a heating coil communicating therein at its intake end, a radiating pipe or coil communicating at both ends with said tank and adapted to discharge above normal water level in the tank, the discharge end of the heating coil communicating with the discharge portion of the radiating pipe to augment the circulation therein.

3. In a device of the class described the combination with a circulating or expansion tank of a heating pipe or coil connected at its intake end in the bottom thereof, a radiating pipe or coil communicating at both ends with said tank and the returning end of the heating coil connecting obliquely in the return portion of the radiating pipe and directed toward the tank to augment the circulation therein, said return end of the radiating pipe discharging above the normal water level in the tank.

4. The combination with an expansion and supply tank of a radiating circuit or coil connected at its ends therein and having its discharge end opening above the water level in said tank, a heating coil opening at its intake end in said tank independently of the radiating coil and at its outer end communicating with the discharge portion of the radiating coil or circuit adapted to heat the water in said coil and to force the same into the expansion chamber and a source of heat to which the heating coil is exposed.

5. In a heating apparatus the combination with an expansion tank or chamber of a radiating pipe or coil having both ends opening therein, the discharge end opening above the water level in said tank, a heating coil having one end opening into the expansion tank and its discharge end opening upwardly into the discharge portion of the radiating pipe and adapted to create a partial vacuum in said pipe and to force the fluid in the discharge pipe into the tank.

6. The combination with an expansion and supply tank of a radiating pipe communicating at both ends therewith, one or more heating coils communicating with said tank at their intake ends, and with the return portion of the radiating pipe with their discharge ends, said return portion of the radiating pipe being increased in size and extending above the normal water level in said tank.

7. The combination in a water heating system with the expansion or supply tank of a radiating pipe or coil communicating at its ends therein, the discharge end of said pipe extending above the bottom of the tank and being of relatively large size, one or more heating coils communicating at their intake ends with the tank, the discharge ends communicating with the return discharge portion of the radiating pipe at its point of enlargement and directed obliquely toward the tank and means heating the coil.

8. In a fluid heating system the combination with a tank of a radiating circuit communicating therein, a heating coil having its intake end communicating with the tank and having the discharge end connecting obliquely in the return portion of the radiating circuit in the direction of flow and acting to augment circulation, said discharge end of the radiating circuit extending above the normal water level in said tank and means heating said coil.

9. In a fluid heating system the combination with a radiating pipe of a heating coil, the discharge end thereof communicating with the return portion of the radiating pipe, an expansion tank opening into the inlet ends of said radiating pipe and heating coil, said radiating pipe discharging above the normal water level in said tank and means heating the fluid in the coil and radiating pipe.

10. In a device of the class described the combination with an expansion tank of a radiating pipe connected therein at its intake end and its discharge end opening therein above the normal water level and a heating coil communicating with the tank at one end and at its other end communicating obliquely with the discharge portion of the radiating pipe and adapted to create a vacuum in the discharge portion of said radiating pipe.

11. In a device of the class described the combination with a heater of an expansion tank above the same, a radiating pipe communicating with said tank at both ends, with the discharge end thereof opening above the normal water level, a heating coil connected in circuit with the radiating pipe and through which the fluid in the radiating pipe passes and a heating coil opening from the tank and communicating with the discharge portion of the radiating pipe adapted to create a vacuum in the discharge end of the radiating pipe.

12. In a device of the class described the combination with an expansion tank of a raidating coil communicating therewith and having its inlet end opening below the water level and its outlet end opening in the tank above the water level, means for heating said coil and a heating coil communicating with the tank and discharge portion of the radiating coil adapted to facilitate the circulation in the radiating coil.

13. In a device of the class described the combination with an expansion tank of a radiating pipe opening at its intake end below the water level in said tank and the discharge end thereof opening above the water level therein and a heating circuit communicating at one end with the expansion tank and discharging upwardly into the discharge portion of the radiating pipe and adapted to heat and force the circulating fluid into the tank.

14. In a device of the class described the combination with an expansion tank of a radiating pipe opening therefrom and thereinto with its discharge end opening above the water level in said tank, a coil communicating at one end with said tank and opening at its other end into the radiating pipe and adapted to heat the liquid in and accelerate the circulation through said radiating pipe and means for heating said coil.

15. In a hot water heating system, the combination with a radiating circuit comprising an expansion tank and a radiator, the return end of the radiator delivering into the expansion tank above the normal water level therein; of a water heating circuit which receives water from said radiating circuit and delivers it to the return end of said radiating circuit relative to said expansion tank.

16. A hot water heating system comprising an expansion tank, a radiator which opens out of the expansion tank below the normal water level therein and which discharges into said tank above said water level, and means for injecting highly heated water into the return end of said radiator near said expansion tank.

17. A hot water heating system comprising an expansion tank, a radiator which opens out of said expansion tank below the normal water level therein and which discharges into said expansion tank above said water level, said expansion tank and radiator thus constituting a circuit for water, and means for withdrawing water from said circuit, heating the same and injecting it when highly heated into the return end of said radiator near said expansion tank.

18. In a hot water heating system, the combination with an expansion tank, of a radiating coil which leads from the expansion tank below the water level therein, the return end of which leads into said expansion tank above the water level, a heating coil adapted to receive a portion only of the water of said system, which heating coil delivers into the return end of said radiating coil near the expansion tank, and a heating device which heats the water in said heating coil.

WILLIAM P. COSPER.

Witnesses:
P. H. TRUMAN,
E. L. BREIDERT.